United States Patent Office.

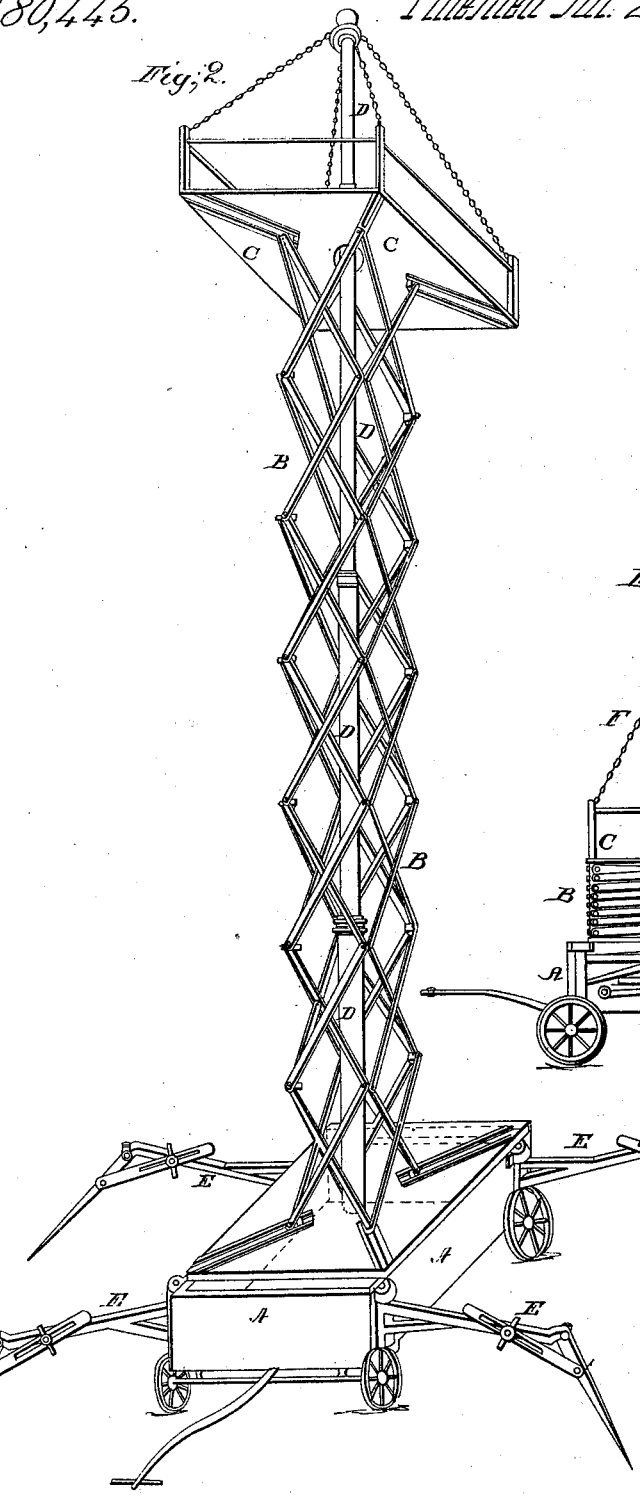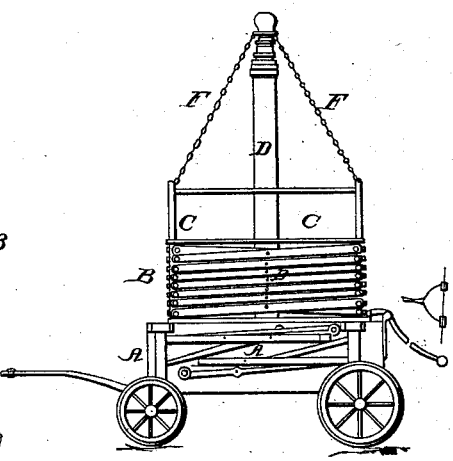

PHILIPP BRAND, OF SPRINGFIELD, ILLINOIS.

*Letters Patent No. 80,445, dated July 28, 1868.*

IMPROVEMENT IN ELEVATOR.

*The Schedule referred to in these Letters Patent and making part of the same.*

Be it known that I, PHILIPP BRAND, of Springfield, Sangamon county, State of Illinois, have invented a new and useful Machine for Elevating Men and Material, to be attached to fire-engines, or for use in mines; and I do hereby declare that the following is a full, clear, and exact description of the construction and operation of the same, reference being had to the annexed drawings, and to the letters of reference marked thereon.

Figure 1 represents the elevator not in use, and closed up.

Figure 2 represents the same extended, or in use.

A is a water-box on wheels, to which is attached the jointed framework B, upon which is the platform C. D is a series of iron pipes fitted and sliding easily within each other, to the top of which the platform C and jointed framework B are attached by means of guys F. The framework B is constructed around these pipes. F are jointed arms attached to the sides of the water-box, which are opened when the elevator is in use, and operate to steady and support it. When not in use, they are folded up to the side of the water-box, as in fig. 1.

Water or steam being forced into the pipes D from below, by means of a force-pump, or any other power, causes them to extend themselves one above the other, and take with them in their ascent the platform C, which movement opens the jointed framework B, as seen in fig. 2.

What I claim as my invention, and desire to secure by Letters Patent, is—

This combination of the jointed framework B, platform C, pipes D, and steadying-arms F, as herein set forth and for the purposes described.

PH. BRAND.

Witnesses:
   GEO. O. MARCY,
   F. EBERLEI.